(12) United States Patent
Uchida

(10) Patent No.: US 7,124,301 B1
(45) Date of Patent: Oct. 17, 2006

(54) DATA PROTECTION METHOD FOR A REMOVABLE STORAGE MEDIUM AND A STORAGE DEVICE USING THE SAME

(75) Inventor: Yoshiaki Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/139,485

(22) Filed: Aug. 25, 1998

(30) Foreign Application Priority Data

Nov. 28, 1997 (JP) .................................... 9-328959

(51) Int. Cl.
G06F 11/30 (2006.01)

(52) U.S. Cl. ........................................ 713/189; 713/193

(58) Field of Classification Search ................ 713/193, 713/163, 200, 202, 165–167, 176, 189; 380/203; 711/163; 360/60; 386/94
See application file for complete search history.

(56) References Cited

U.S. PATENT DOCUMENTS

| | | | |
|---|---|---|---|
| 4,864,542 A | * | 9/1989 | Oshima et al. ........ 365/189.01 |
| 5,058,162 A | | 10/1991 | Santon et al. .................. 380/25 |
| 5,533,125 A | * | 7/1996 | Bensimon et al. ............ 711/163 |
| 5,563,947 A | * | 10/1996 | Kikinis .......................... 705/51 |
| 5,644,444 A | * | 7/1997 | Braithwaite et al. ........... 360/60 |
| 5,677,952 A | | 10/1997 | Blakley, III et al. ............. 380/4 |
| 5,796,943 A | * | 8/1998 | Fujioka ....................... 713/202 |

FOREIGN PATENT DOCUMENTS

| | | |
|---|---|---|
| JP | 58178456 | 10/1983 |
| JP | 60189531 | 9/1985 |
| JP | 2141056 | 5/1990 |
| JP | 417160 | 1/1992 |
| JP | 4192027 | 7/1992 |
| JP | 5292176 | 11/1993 |
| JP | 855022 | 2/1996 |
| JP | 8263383 | 10/1996 |
| JP | 9114745 | 5/1997 |
| JP | 9134311 | 5/1997 |
| JP | 9134330 | 5/1997 |
| JP | 9198778 | 7/1997 |
| WO | 9514265 | 5/1995 |
| WO | 9628820 | 9/1996 |

* cited by examiner

Primary Examiner—Hosuk Song
(74) Attorney, Agent, or Firm—Greer, Burns & Crain, Ltd.

(57) ABSTRACT

A data protection method is used for protecting data recorded on a removable storage medium, such as an optical magnetic disk. The method includes the steps of authorizing to read and access a part of a directory area on a storage medium without specifying a password given to the removable storage medium. When accessing the removable storage medium, a user is required to input a password, the inputted password is compared with a predetermined password, and if not coincident, access is inhibited, and further, if coincident, it is permitted to access only one part of an area of the removable storage medium.

22 Claims, 13 Drawing Sheets

DATA PROTECTION METHOD FOR A REMOVABLE STORAGE MEDIUM AND A STORAGE DEVICE USING THE SAME

BACKGROUND OF THE INVENTION

1. Field of the Invention

The present invention relates to a method for concealing and protecting data by employing a password to read and overwrite the data recorded in a removable storage medium provided in a storage device, which is connected to an information processor, such as a computer, a word processor and an electronic book apparatus, under a control from the storage device or the information processor, and the present invention also relates to a storage device using the method.

2. Description of the Related Art

There is a case where information should not be accessed by other persons that an original holder or administrator, because such the information relates to a personal privacy or secret information on business recorded in a storage device connected to an information processor, such as a computer and a word processor.

However, it is almost easy to access the storage device of the information processor so as to retrieve data and to copy bulk data. This brings problems such that important data can be easily accessed and modified.

To avoid such problem, it has been proposed that a password is given to a storage device, and then, a user must input the password when accessing data on the storage device. Then, if the inputted password does not coincide with a correct password given to the storage device, the user cannot be authorized to access the storage device.

Various kinds of such structures and methods have been proposed, for example, in Japanese laid open patent applications No. 58-178456 (first conventional method), 60-189531 (second conventional method) and 4-192027 (third conventional method).

In the first conventional method, a basic structure is disclosed, in which a password is recorded in a magnetic disk to allow the access to the disk only when the password is coincident with an inputted password.

In the second conventional method, the structure is intended to protect contents stored in, particularly, an external storage medium having a large storage capacity. However, a password given in a storage medium is checked with a password that supplied from an upper level device, and if both the passwords coincide, a user can access the storage medium, similarly to the first conventional method.

These conventional methods are applicable not only to a storage device, such as a fixed disk having a large storage capacity with a volume table of contents (VTOC), but also to various kinds of removable storage mediums, such as storage devices with volume administrative information and an optical magnetic disk.

Further, it is assumed in the third conventional method that one removable storage medium can be accessed from multiple persons. When one removable storage medium is divided into a plurality of logical partitions, a password is specified in each of the logical partitions. Therefore, it is possible to provide an exclusive partition for each user by inputting a password.

However, the following problems are brought in either of the above-described conventional methods.

That is, supposing a user uses plural removable storage mediums and then the user forgets in which removable storage medium a specified document is stored, the user must access all storage mediums randomly to find out which storage medium stores the specified document.

However, when a password is set to a storage medium, i.e., a disk, according to the above-described conventional methods, the user should input the password every time he accesses the disk. That brings complicated operation for the user. Therefore, there is a possibility that the user wants to avoid the troublesome and then sets only one password for almost all disks, without differing the password in each disk.

Moreover, it should be considered that a situation where a user forgets which storage medium provided in a removable storage device has stored a specified document may frequently occur. This is because such the information itself that a certain storage medium "01" stores a specified document "A", such as a diary, should be concealed.

To avoid the above-described situation or condition, the user may put the label title such as the "secret business documents" on a storage medium "01", for example. This gives to the others a chance to illegally access data, and then, the secret may leak out. With the same reason, it is not suitable administration to print out a list of contents in each disk. Therefore, disk administration may become to be dependent on user's memories or uses easy keywords.

Further, in an other mode, there is a case where one user instructs the other person to find and take out a disk, on which business information is recorded due to urgent requirement on ordinary business. In this case, a password is not informed to the instructed person, and therefore, the person cannot know which disk he should take out.

Actually, the user should inform the password to the instructed person, or the disk administration is operated without any password in consideration with such the condition. In the foregoing case, the number of persons having known the password of the removable storage medium will increase unintentionally, and therefore, it becomes a problem from the view of the security. On the contrary, in the later case, a security function can not be fundamentally employed.

On the other hand, a library storage device has been employed for automatically administrating multiple storage mediums. It is now considered to treat a storage medium protected by a password in such the storage device. In this case, a label or a serial number is employed on an individual storage medium to specify each of the multiple storage mediums, which the library storage device administrates. Therefore, it is necessary that the library storage device can read out the label on each storage device.

However, if a password is specified to refer such the label or the substation, it is general that the same password is specified to all disks that the library device administrates. In such the mode, once a password is specified to one disk, access all storage mediums would be permitted. Viewing from the point of system security, this situation is not acceptable.

As described above, situations where disks are frequently exchanged and are referred occurs in a removable storage device. Therefore, when employing either of the conventional methods, it is inclined to form a careless administration, such that only one password is specified for almost all storage mediums. More particularly, the problem occurs if either of the above-described conventional method is applied to multiple removable storage mediums. As a mass-storage medium has larger capacity, much information illegally referred will increase, and therefore, a serious problem will occur.

SUMMARY OF THE INVENTION

Accordingly, it is an object of the present invention to provide a method for concealing and protecting data in a removable storage medium, such as an optical magnetic disk, to overcome the above-described shortage in the conventional methods, and a storage device using the same.

To attain the above-described object, the present applicant had noticed the following point:

In the conventional methods, accessing a whole storage medium is permitted even when accessing only one part of information, such as administration information, i.e., information of a recorded file name. That causes the above-described problem for concealing and protecting data.

Further, administration information on a storage medium is generally written on a specified location or comparatively collective area. Or, in many cases, the administration information on the storage medium can be restricted in a comparatively small area.

Therefore, the present invention has a feature for comparing an inputted password with a predetermined password when accessing a removable storage medium, inhibiting access to a whole removable storage medium if both of the passwords are inconsistent, but permitting only to read and access only a part of the removable storage medium including an administration area by employing a certain means.

In a mode of the present invention, a password for permitting read access to only a restricted area is provided separately from a password, which is required to access the whole removable storage medium.

For instance, an optical magnetic disk, which is prescribed in ISO-13963, is managed by dividing 10 areas called as bands 0 to 9. Two passwords are provided to the optical magnetic disk. When the first password coincides, a user is allowed to access all of the bands 0 to 9, and when the second password coincides, the user is allowed to access only the band 0, on which the administration information is recorded.

As file system administration information is generally written on the band 0 in some file systems, the user cannot access the whole disk, but he can access only the file system administrative information as the result in this mode.

Further, in another mode of the present invention, a password for controlling access to a removable storage medium is set in advance in an exclusive area, of the removable storage medium, which a file system does not administrate.

When a password specified by a command sent from a computer coincides with a predetermined password for permitting a user to write and read, the user can write and read to the whole removable storage medium on forward.

Additionally, when the password specified by a command coincides with a password for permitting the user to read a part of the removable storage medium, the user can read out data only within a permitted range.

Furthermore, in one mode of the present invention, one part area of the removable storage medium is recorded with a plain text, so that more utility can be obtained in a data protection method for removable storage medium by which data is encrypted and stored in the removable storage medium, a password is verified, and the data encryption is decoded when the password is authentic.

When the password is determined not authentic by the verification, it becomes possible to access and read only one area of the removable storage medium where the plain text is recorded.

As another mode of the structure employing the data encryption, first and second passwords are employed. In other words, data is encrypted and recorded by the second password in one part area of the storage medium, and the data is encrypted and recorded by the first password in the other part area of the storage medium. Then, the second password is encrypted by the first password and the second password is recorded in a specific reserved area of the removable storage medium.

The one part area of the removable storage medium is encrypted and decoded by the second password, and other areas are encrypted and decoded by the first password.

Thereby, when the password specified before accessing the removable storage medium is authentic as a first password, it becomes possible to access the whole of the removable storage medium by decoding the second password by the first password. Further, if the password is not authentic as the first password, it becomes possible to read only the one part area of the removable storage medium by employing the password as the second password.

In each of the above-described modes, one part of the removable storage medium to which read access is permitted includes a label given to the removable storage medium, or all of or a part of the directory area as administrative information.

Additionally, to determine the label given to the above-described removable storage medium or the part of the directory area, the present invention provides the following methods: a method for determining from a capacity of the removable storage medium and a logical format type considered, and a method for writing a range specification by the use of a start logical block address and an end logical block address in a specific reserved area of the removable storage medium in advance, or a method for identifying an administrative area including a label or directory by an interface section for identifying a logical format of the storage medium, such as a device driver.

With the structure of the present invention, even if the password given to the storage medium is not specified, the user is permitted to access one part of the directory area on the storage medium for reading out data from the one part.

Therefore, it becomes possible to know an outline of information recorded in the storage medium without complicating password administration, or making a security hole, i.e., without giving a weak point and loophole on security function. Thereby, it becomes possible to avoid careless accessing to secret information.

For example, it is possible to set a same password for reading out administrative information to all disks, i.e., storage mediums and each different password to each disk for accessing data in actual. This realizes that a retrieve to know which disk stores the required file can be executed by exchanging disks actually.

For example, when a user instructs to an other person to deliver a disk in which a file named as "aa" is stored, the contents of the file "aa" cannot be accessed, and therefore, the possibility of leaking secret information can be reduced.

BRIEF DESCRIPTION OF THE DRAWINGS

FIG. 4 shows a flow chart for setting an authorized access range corresponding to the table 1 when a storage medium is inserted or a power of a device is ON.

DESCRIPTION OF THE PREFERRED EMBODIMENTS

Figure 1:
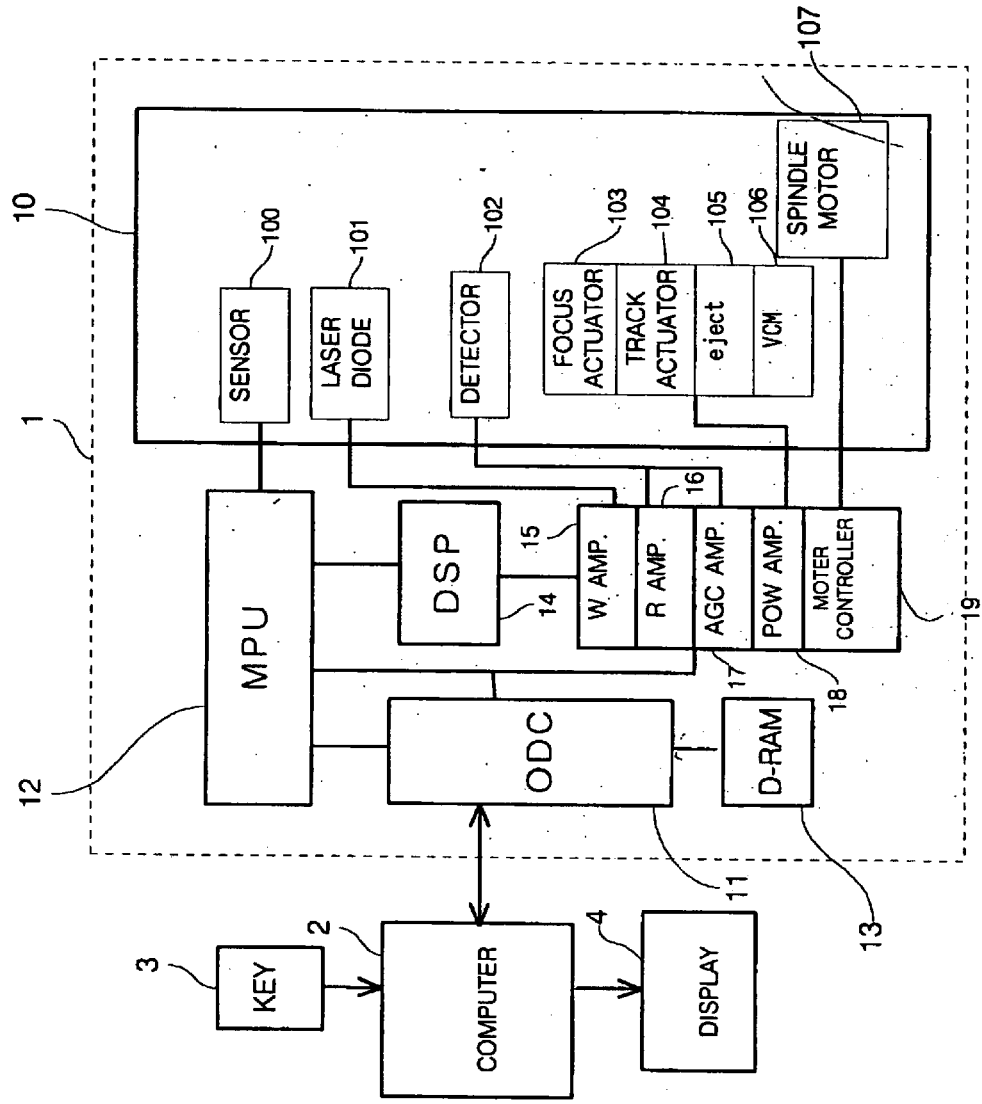
FIG. 1 is a block diagram of one embodiment of an information processor including an optical magnetic disk apparatus as one embodiment of a storage device according to the present invention.

Throughout the following descriptions, the same reference numerals are used to denote and identify corresponding or identical components.

FIG. 1 is a block diagram of one embodiment of an information processor including an optical magnetic disk apparatus as one embodiment of a storage device applying the present invention. Although an magnetic disk apparatus will be explained as an embodiment, the present invention is not restricted to the optical magnetic disk apparatus. It should be of course understood that an magnetic disk apparatus or an optical disk apparatus for only reading out data is also applicable to the present invention.

Returning to FIG. 1, an optical magnetic disk apparatus 1 includes a system controller 10 for writing to and reading out from an optical magnetic disk used as a storage medium, and further, a control circuit section including an optical magnetic disk controller (ODC) 11 having a firmware where a software is stored to execute a method according to the present invention.

A control circuit section includes a MPU 12 for controlling storage device 1 in total, a D-RAM 13 which is a buffer memory for reading or writing data, a DSP 14 for performing arithmetic conversion of reading and writing data, an amplifier 16 for reading data, an AGC amplifier 17, a power amplifier 18 for driving a head and a disk rotation motor controller 19.

The system controller 10 includes a head sensor 100, a laser diode 101 for writing, driven by the amplifier 15, and a detector 102 for reading data, connected to the amplifier 16.

Additionally, the system controller 10 includes a focus actuator 103, a track actuator 104, a disk taking out (eject) motor 105 and a voice control motor 106 for driving a head, which are controlled by the power amplifier 18, and further, a spindle motor 107 controlled by the motor controller 19 for rotating disk.

On the other hand, reading and writing data is controlled by a SCSI command sent from a computer 2 to the optical magnetic disk controller (ODC) 11 according to an operator's instruction inputted from a key board 3. A display device 4 for displaying writing or reading data is connected to the computer 2.

Optical magnetic disk controller (ODC) 11 including a firmware formed by a flush ROM has a function for analyzing a SCSI command sent from computer 2. It further has a function for controlling the system controller 10 to write and read data according to the SCSI command operated along with the MPU 12.

It is of course understood that the present invention is not restricted to a SCSI command group, but is applicable even to other command groups, such as ATA, ATAPI or SASI.

Figure 2:
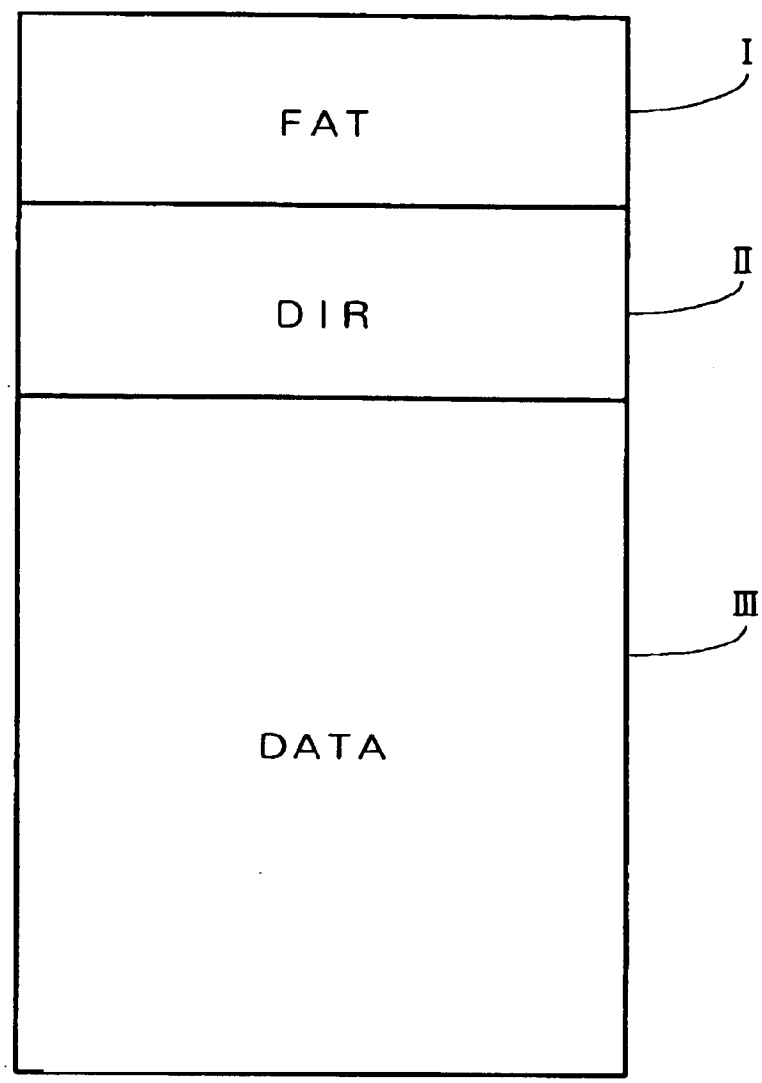
FIG. 2 is an explanatory diagram of a structural layout of an optical magnetic disk storage medium, illustrating only a data zone of the optical magnetic disk storage medium.

In here, a mechanical layout of a removable storage medium including an optical magnetic disk will be now considered. FIG. 2 illustrates only a data zone of a removable storage medium. In the forward and backward sections of the data zone shown in FIG. 2, there is a test zone, not shown in FIG. 2, and an area or a reserved area where a firmware in a storage device administrates the disk and which is not used as an area for writing user data, along the radius direction of the removable storage medium.

The data zone of a removable storage medium shown in FIG. 2 includes a file allocation table (FAT) I for administrating an area in each cluster, which is a unit for writing data, a root directory II for showing a name or an attribute of a file or a directory, or a starting cluster number, and a data area III where contents of the file is recorded.

It is possible to calculate an logical block address from a cluster number by simple arithmetic.

Figure 3:
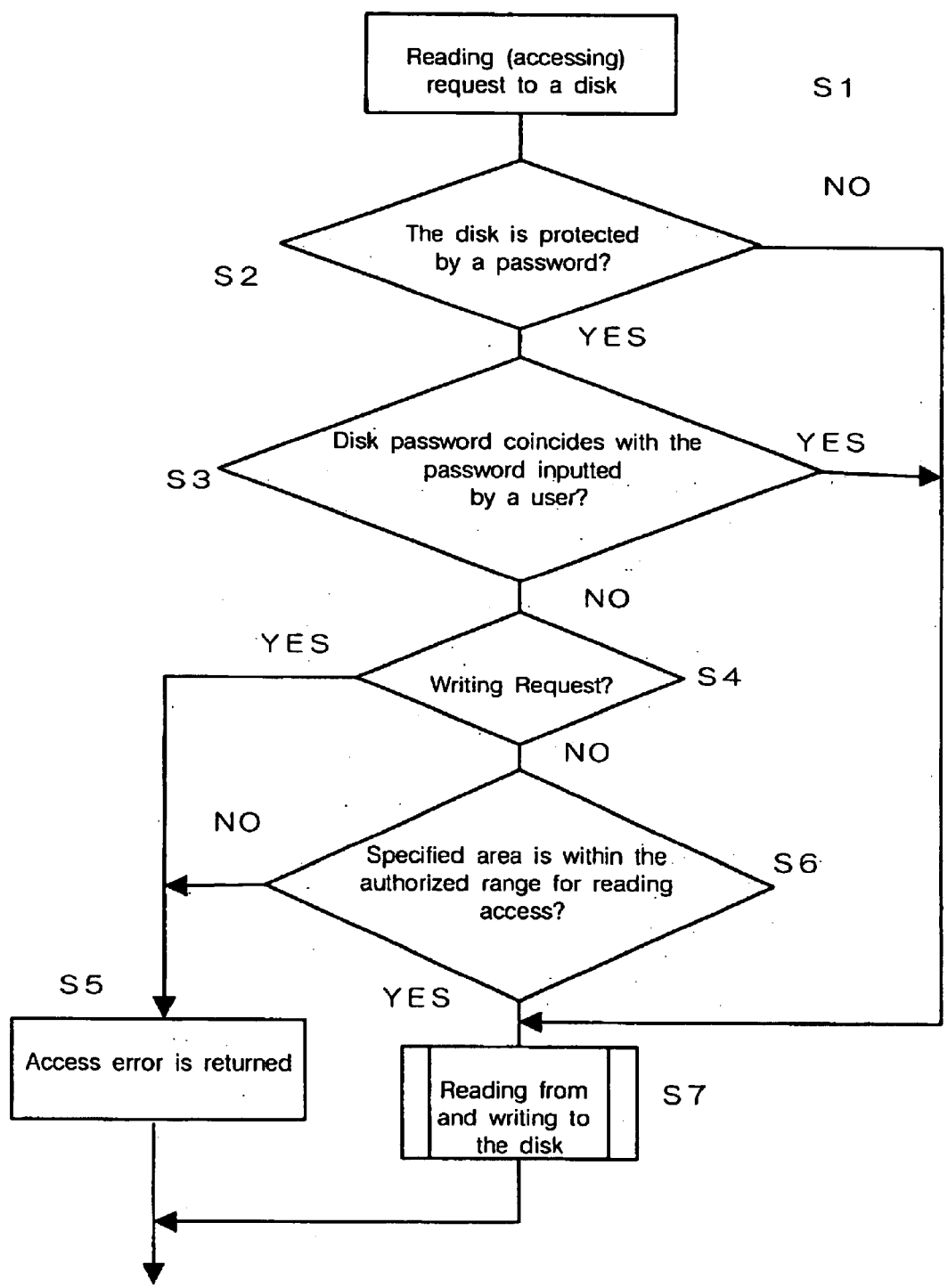
FIG. 3 shows an operational flow chart of a first embodiment according to the present invention in an information processor including a storage device employing a removable storage medium, such as an optical magnetic disk.

FIG. 3 is an operational flow chart of the first embodiment according to the present invention in an information processor including storage device 1 of a removable storage medium, such as an optical magnetic disk. A user can access only directory information stored in the root directory II shown in FIG. 2 by specifying one part including a volume label or directory information, i.e., an administration area of the removable storage medium, within a logical block address (LBA) as an authorized access range.

As information of a file name, a directory to which a file is belonging and a start address is written in a root directory II, it is possible for user to easily find a location where a required file exists.

At first, a reading request command is sent from the computer 2 to the optical magnetic disk controller (ODC) 11 including a firmware of the storage device 1 employing a removable storage medium according to a SCSI command (STEP S1).

Thereby, the optical magnetic disk controller (ODC)11 judges whether or not an optical magnetic disk type storage medium of which writing/reading is controlled by the system controller 10 is protected by a password (STEP S2). In here, the medium is not protected by a password, it is possible to read out from and write to a disk according to a read or write processing routine (STEP S7).

On the other hand, when it is registered in optical magnetic disk controller (ODC) 11 that the appropriate storage medium is protected by a password, i.e., a password is registered to the optical magnetic disk controller 11 in advance, the optical magnetic disk controller (ODC) 11 judges whether or not the password specified by a user coincides with the registered password (STEP S3).

In this example, the judgment whether or not a password coincides with the registered one is to determine authenticity of the password. Accordingly, the user can verify a password specified by the user by performing a certain operation to the specified password and recording the password performed with the certain operation in advance and comparing it with a password, which is specified by the computer 2 and performed with the certain operation in the same way, instead of comparing two passwords, directly.

The password specified by the user is inputted from the keyboard 3 before an access request is sent from the computer 2.

In the above-described explanation, the optical magnetic disk controller (ODC) 11 includes a function for interfacing to the computer 2, and the computer 2 includes a function for interfacing to the optical magnetic disk controller (ODC) 11.

Therefore, it is possible to configure so as to execute the judgment whether or not the password specified by the user coincides with the registered one in the interface section of the computer 2.

Then, when the passwords coincide with each other, it becomes possible to execute processing for reading from or writing to a whole disk (STEP S7). If the both passwords do not coincide, it is judged whether or not the access request is for writing (STEP S4). If it is for writing, an error is notified to the computer 2 as an access error. The computer 2, for example, displays an error message on the display device 4, to inform to the user according to an error processing (STEP S5).

If not, in other word, the request is for reading, a specific area included in the above-described access request command sent from the computer 2 is checked. Then, it is checked whether or not the requested specific area is within an authorized range for reading access (STEP S6).

If the requested specific area is not within the authorized range for reading access, an error is notified to the computer 2, similarly to the writing access request (STEP S5). If the requested specific area is within the authorized range for reading access, the user can read data in read or write processing routine (STEP S7).

In other word, it is possible only to read data within the authorized range for reading access, regardless of coincidence or incoincidence of the both passwords in the embodiment according to an operational flow chart shown in FIG. 3.

In here, the authorized range for reading access can be specified by a range of a logical block address (LBA) in a removable storage medium as an embodiment. Additionally, the range of LBA for authorizing the reading access is specified so as to include a root directory II to which information of the name and attribute of the file are written as explained in accompanying to the above-described FIG. 2.

In here, the LBA range including the root directory II varies according to capacity of the removable storage medium. For example, when a storage medium is inserted into the storage device 1 or the storage medium has been inserted on supplying a power for the information processor, the range is set according to the inserted storage medium so as to obtain a suitable range for the storage medium.

Figure 4:
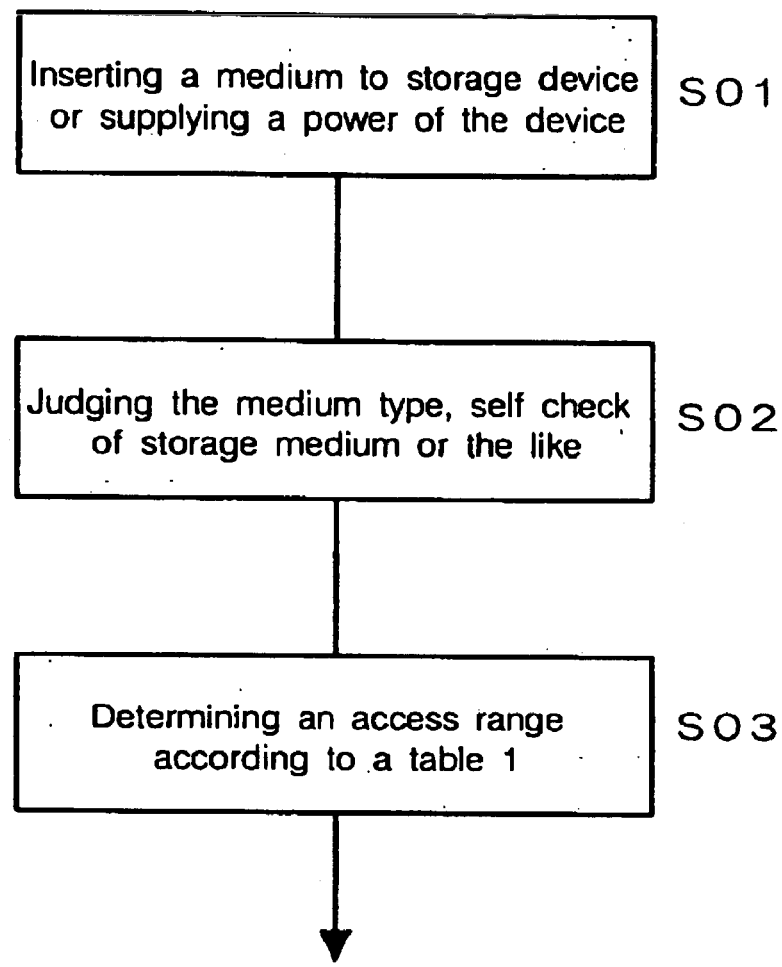

In other word, as shown in the flow chart of FIG. 4, when inserting a removable storage medium to the storage device 1 or supplying a power for an information processor (STEP S01), a type of the inserted storage medium is checked, and settings are performed according to the type (STEP S02).

Then, an authorized range for access is determined according to a relationship indicated in a table 1, which is an example table for determining the authorized range for reading access (when a sector length is 512 bytes)

TABLE 1

| CAPACITY OF MEDIUM (MB) | spc | AUTHORIZED RANGE FOR ACCESS (LEAST UPPER BOUND OF LBA) |
|---|---|---|
| Less than 128 MB | 4 | $\frac{cap}{spc \times 128} \times 2 + 32 + 32$ |
| Less than 256 MB | 8 | |
| Less than 512 MB | 16 | |
| More than 512 | 32 | |

*cap means total capacity of a storage medium in a 1024 byte unit
*spc means a sector number in a cluster Actually, a logical format is estimated within a suitable range, and then, the LBA range for authorizing access is calculated according to the capacity of the storage medium. In this example, super floppy and hard disk format types are considered as a logical format type typically used in a personal computer. Then, it is assumed that FAT 16, i.e., a file allocation table for 16 bits, is employed in a segment format type, and the authorized range for access is set from LBA=0 to a least upper bound of LBA illustrated in the table 1 according to the capacity of the storage medium.

In other words, the authorized range for access can be specified by start and end logical block addresses.

In the method for deciding the authorized range for access based on the capacity of the storage medium, when referring to examples of the formats written on disks by the super floppy format type and the hard disk format type,the LBA range for authorizing access does not always coincide with an area in which directory information is written by the both format types (refer to II of FIG. 2).

TABLE 2

| Start LBN | | | |
|---|---|---|---|
| SFPD | HDD | SECTOR NO. | For USE |
| null | 0 | 1 | Boot Code |
| null | 1 | 31 through 63 | Idle for boundary control |
| 0 | 32–64 | 1 | Reserved area for boot code |
| 1 | | nsc*2/(spc*ssize) | FAT |
| | | nsc*2/(spc*ssize) | FAT (Reserved) |
| | | 512*32/ssize | Root directory |

*SFPD—Super Floppy format type
*HDD—Hard Disk format type
*nsc—Total number of sectors in a storage medium
*spc—A number of sector per a cluster (refer to Table 1)
*ssize—Sector size in a bite unit However, when an optical magnetic disk of which a logical format is a super floppy or hard disk format type, which is frequently used in general, is employed as a storage medium, for example, an area having at most several ten KBs other than the area where directory information is written is included for spare in the LBA range for authorizing to read.

Even if that extent of data in a file data area other than the directory information is read out, this does not become a problem in general. If this is a problem, a file readable for other persons can be written to a header section of a data area III when initializing the disk to avoid this problem. This makes it possible to prevent from reading out the data that requires secrecy with the directory information.

For example, it is possible to prevent from reading out secret data by writing in a header section, an OS, application program, font data, and a directory, which are available on the market, or data opened to public through an inter-personal computer communication.

A case where the storage device 1 handles a logical disk format will be considered in here. It is also possible to prepare a mechanism for making it invalid to calculate the LBA range for authorizing access according to capacity of the storage medium by a switch provided on the storage device 1.

When the LAB range becomes invalid, the mechanism for authorizing access only to the directory area regardless the logical format cannot be employed. Accessing not only a directory area but also data area must be allowed in order to read out the directory area. In other words, the user can read out the whole storage medium, or not.

Access control employing data encryption will be now considered. In this method, the access control method according to the present invention can be implemented by employing a device driver, i.e., a software, in the storage device 1 having no special mechanism for access control, such as an existing floppy disk device or optical disk device.

At first, data recorded in a disk are all encrypted for access control to the whole storage medium, i.e., a disk. Various kinds of data encryption methods can be employed as a data encryption method, not restricted to the embodiments of the present invention. After inserting a disk into the storage device 1, a user sets a password, i.e., a disk password, in each disk until accessing to the disk at first. This password is used as a key or a part of the key on the data encryption.

Therefore, when accessing data for next time, data can be correctly decoded if the user inputs a password and the inputted password is matched, and therefore, the user can correctly access the data. If the password the user specifies is not matched, the following two methods can be considered.

A first method to be considered is to decode the data as it is, regardless of the result from the password verification. Because the read out data is abnormal, the user can now understand that the password is not correct. As the result, the user cannot obtain normal data, and in other words, the user cannot access the data. In a second method to be considered, if it is detected by some means that the password is not correct, the user is inhibited to access the data in all.

Figure 5:
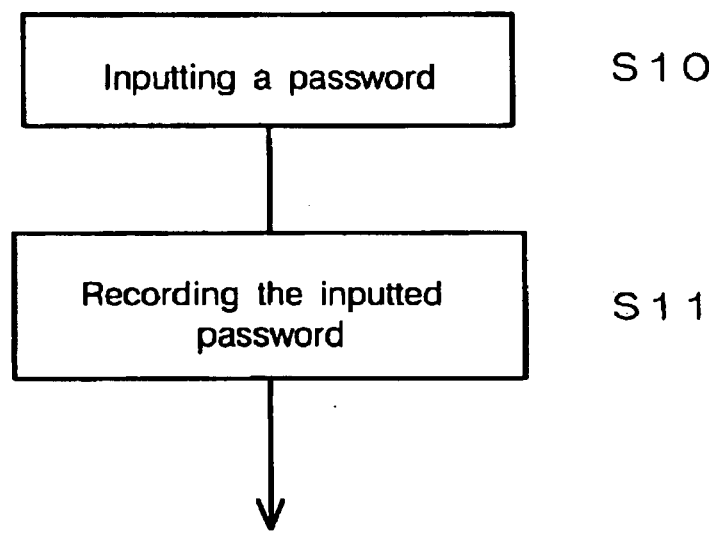
FIG. 5 is a flow chart for explaining registration of a disk password in a first example for the second embodiment.
Figure 6:
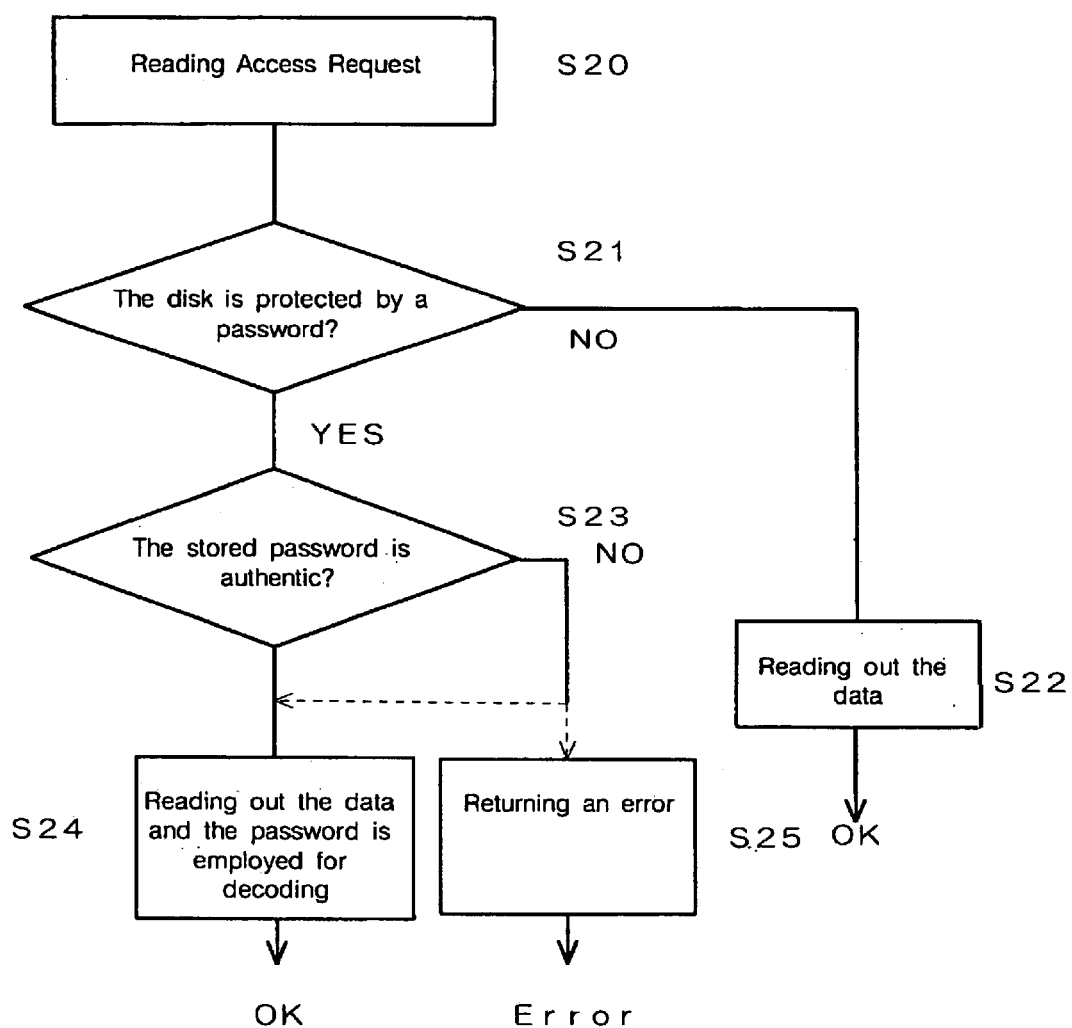
FIG. 6 is an operational flow chart of the first example for the second embodiment.

The above-described two methods to be considered will be further explained in accompanying with FIGS. 5 and 6. In FIG. 5, a user inputs a disk password at first (STEP S10). The inputted password is stored in a memory that a disk driver administrates (STEP When realizing as a storage device, the disk password the user inputs is transmitted to the storage device, and the storage device stores the password in a built-in memory, for example, the D-RAM 13 shown in FIG. 1 (this step is corresponding to the step S 11).

Then, a reading access request is transmitted from the computer 2 to the storage device 1 according to, for example, a SCSI command (STEP S20), and the data is read out. Then, the disk driver judges whether or not the disk password is already registered to the disk to be accessed or the disk is already protected (STEP S21). Further, when realizing as a storage device, this judgment may be performed by a firmware, for example, of the optical magnetic controller (ODC) 11, shown in FIG. 1.

If the disk is not protected by the disk password, the data can be read out (STEP S22). If so, it is judged whether or not the password inputted and stored at the step S11 is authentic, for example, it is judged whether or not the inputted and stored passwords coincide (STEP S23).

If the password is authentic, the data is read out and the password is employed as a decode key for decoding (STEP S24). If the password is not authentic, an error is returned (STEP S25). Or the data is decoded as it is, similarly to the case where the password is correct illustrated in a dotted line of FIG. 6. In this case, the result of decoding the data is usually not correct, and therefore, the decoded data cannot be readable or understandable.

When realizing as a storage device, this judgment is performed in a firmware of the storage device, for example, the optical magnetic disk controller (ODC) 11 shown in FIG. 1.

The second embodiment of the present invention has a feature to put for practical use more effectively than the methods to be considered as shown in FIGS. 5 and 6. Two examples according to the second embodiment of the present invention, which is improved from the password protect methods shown in FIGS. 5 and 6, will be now explained.

In the first example, a label or root directory of a disk to be accessed at first is stored in a plain text without encrypting the whole disk. It is a matter of course that the area for the label or root directory is not subject to a decoding processing.

Further, if a password a user inputs is not authentic, reading access is not restricted in the root directory area. As the result, the user may read out the root directory, regardless of the inputted password, similarly to the case explained in FIG. 3.

Figure 7:
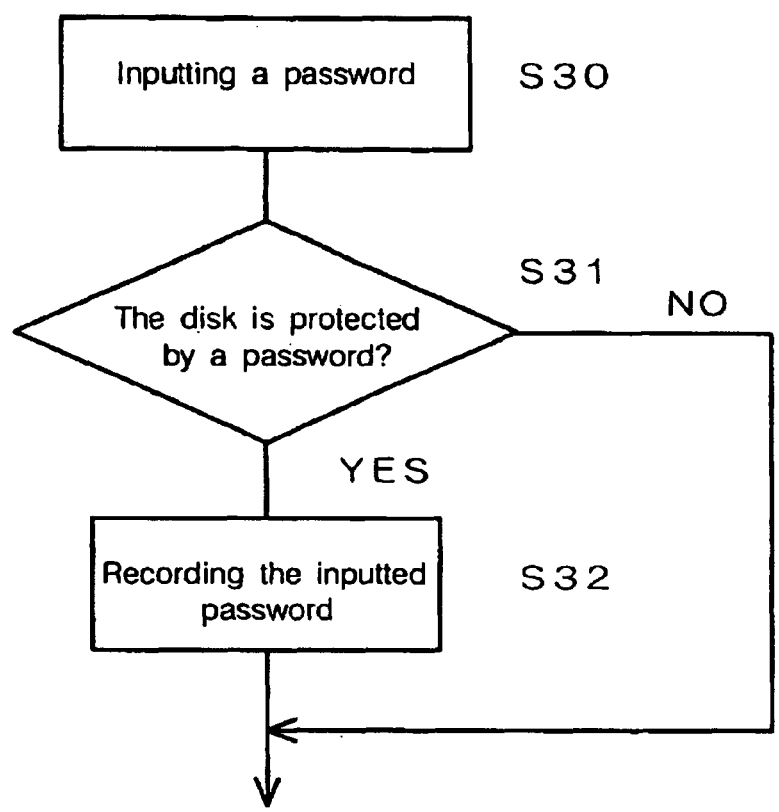
FIG. 7 is a flow chart for explaining registration of a disk password in a second example or the second embodiment.

An operational processing flow chart of this example will be explained in accompanying with FIGS. 7 through 9. This example is realized as a storage device. In FIG. 7, a user inputs a disk password in advance (STEP S30). Then, the optical magnetic disk controller (OCD) 11 judges whether or not the disk is protected by a password (STEP S31). If the disk is protected by the password, the inputted password is recorded in, for example, the D-RAM 13 of FIG. 1 (STEP S32).

Figure 8:
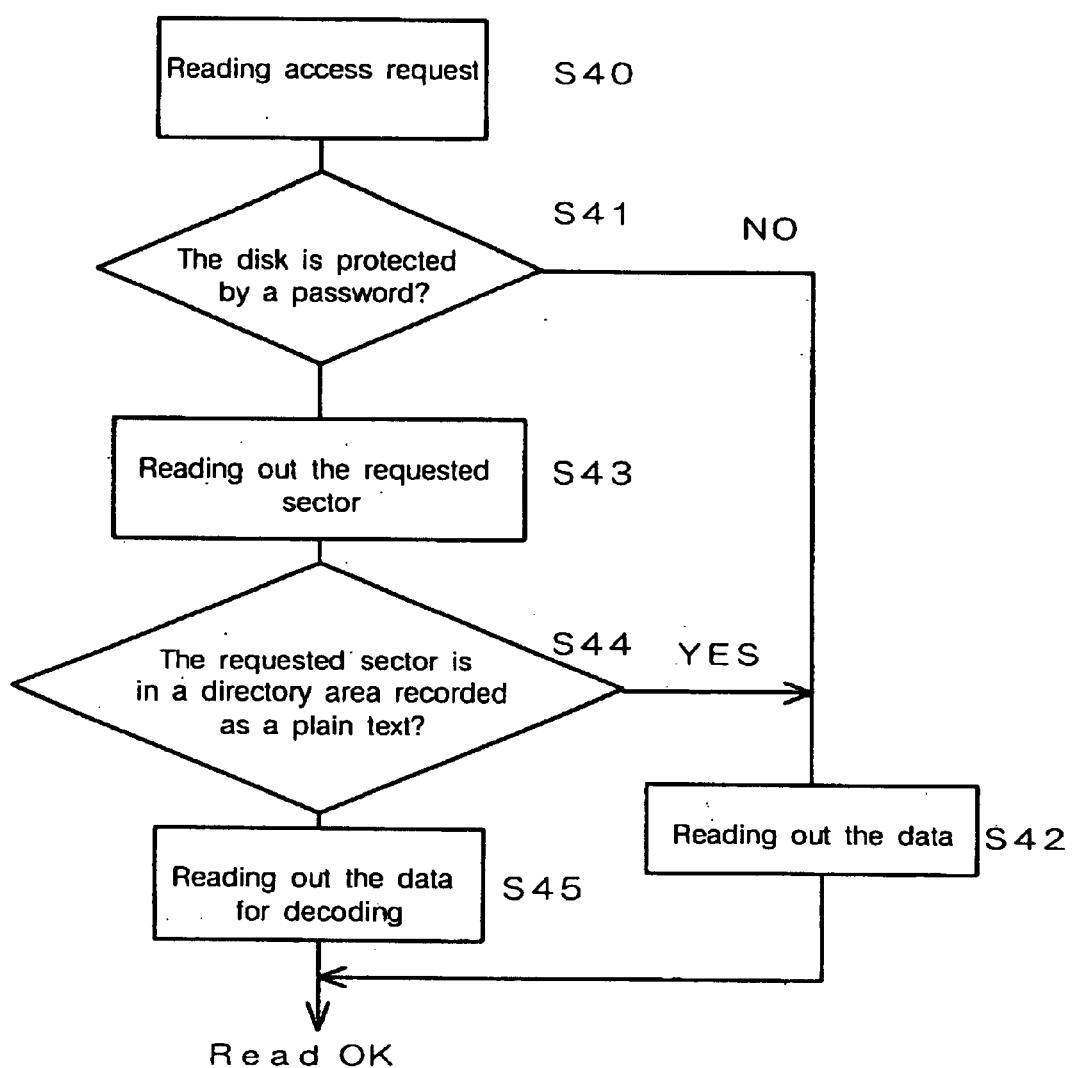
FIG. 8 is an operational flow chart when controlling to read in the second example for the second embodiment.

Next, when reading out the data, the process of the operational flow processing in FIG. 8 is executed. In the case of reading access (STEP S40), the disk driver judges whether or not the storage medium is protected by a password (STEP S41).

If the storage medium is not protected by a password, data may be read out (STEP S42). If the storage medium is protected by the password, the required sector is read out (STEP S43). Then, it is judged whether or not the read out sector is in a directory area recorded as a plain text, which is not encrypted (STEP S44).

If data is recorded in a plain text, the data can be read out (STEP S42). If data is encrypted, the data is read out for decoding (STEP S45).

Figure 9:
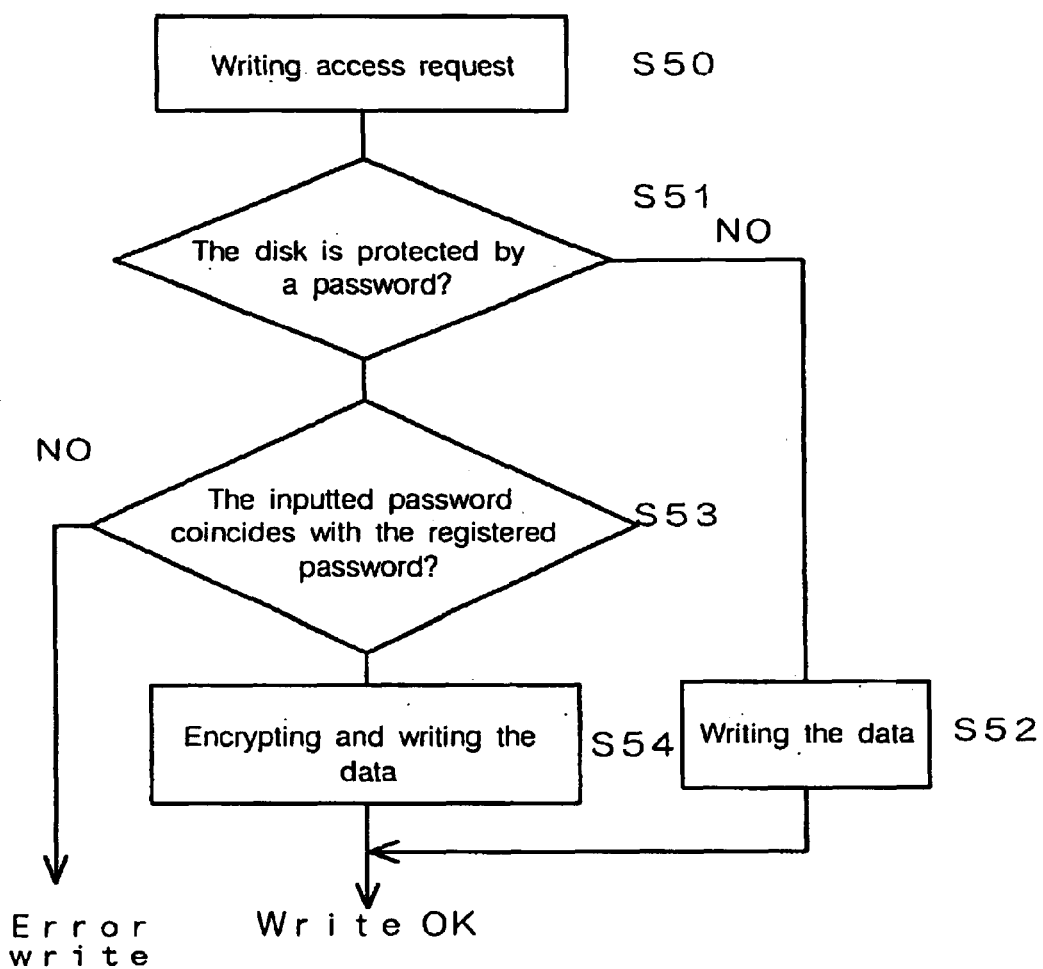
FIG. 9 is an operational flow chart when controlling to write in the second example for the second embodiment.

Further, the processes for writing data will be performed according to the flow chart illustrated in FIG. 9. If a user requests to write data (STEP S50), the disk driver stored in the interface section of the computer 2 judges whether or not the storage medium is protected by a password (STEP S51).

If it is not protected by a password, the data is written (STEP S52). If it is protected by a password, the system instructs the user to input the password, and it is judged whether or not the inputted password coincides with a registered password (STEP S53).

Then, if the inputted password does not coincide with the registered password, a writing error is returned. If the passwords coincide, the data is encrypted and is written (STEP S54).

An authentic password or data for validity check of the password is written to a reserved area of the disk in advance. It is also possible to write an authentic password in the inside of the storage device, for example, in a non-volatile memory managed by the optical magnetic disk controller (ODC) 11 of FIG. 1. In this case, a same password may be commonly employed for a plurality of storage disks.

The above-described processes are explained for realizing the present invention in a storage device. The processes can be also executed in the interface section of a computer connected to the storage device, for example, an interface card or device driver.

Next, a method where a second password is employed separately from a first password for protecting the whole disk will be explained as a second example for protecting to access by employing data encryption.

In this embodiment, the root directory is encrypted by employing the second password. Further, a reserved area not included in the root directory is provided on a disk, and the second password is encrypted by the first password to write to the reserved area. The above-described processes are performed when the disk is initialized.

Figure 10:
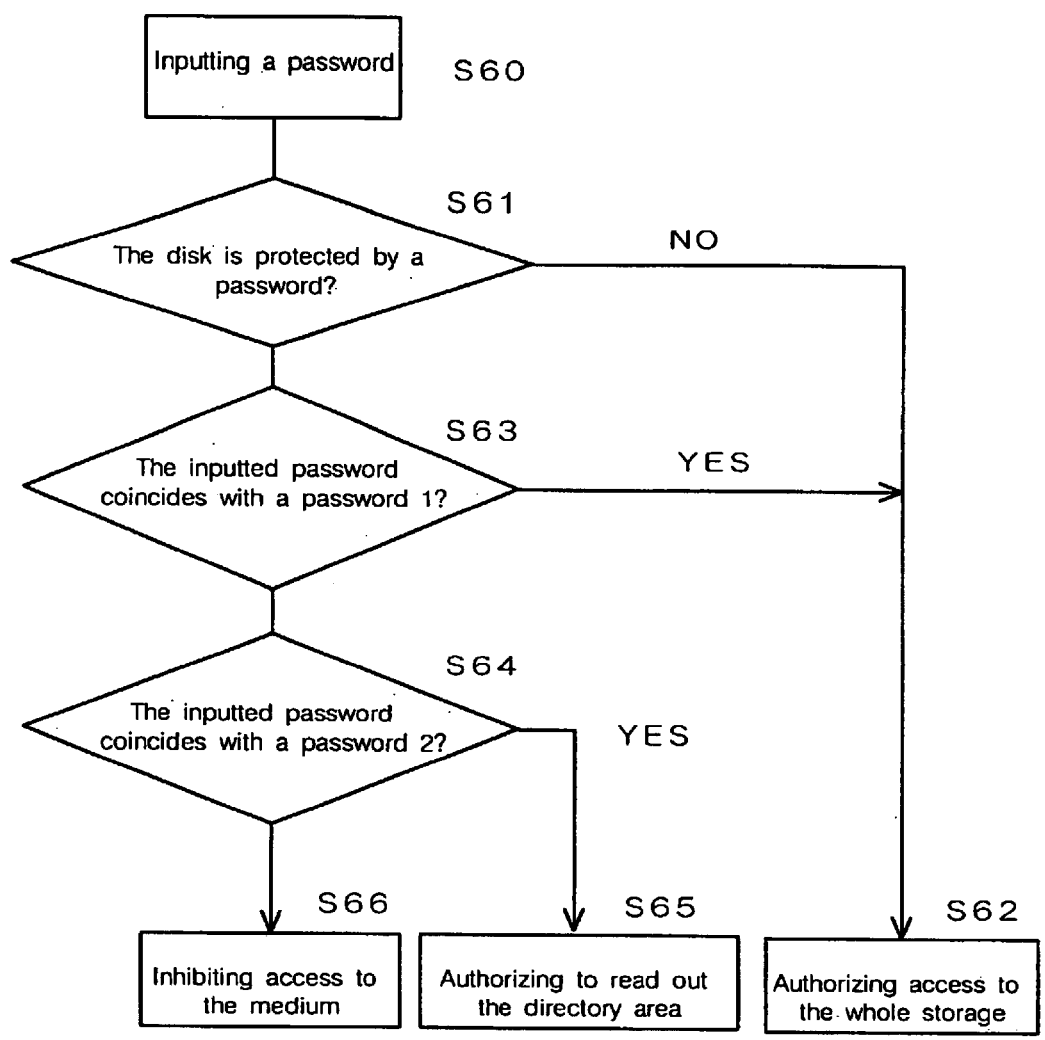
FIG. 10 is an operational flow chart for explaining a control when employing two passwords in the third embodiment.

In the above-described definition, the processes will be explained in accompanying with a flowchart shown in FIG. 10. A password inputted from the user is received by a disk driver stored in the interface section of the computer 2 (STEP S60). Then, the disk driver judges whether or not the disk is protected by a password (STEP S61).

If the disk is not protected by a password, the user is authorized to access the whole storage medium, regardless of the password inputted from the user (STEP S62). If the disk is protected by a password, it is judged whether or not the inputted password coincides with the first password (STEP S63). In other words, the disk driver verifies whether or not the inputted password is authentic as the first password.

In this verification, if the inputted password is invalid as the first password, it is regarded as a second password, and the rood directory area is decoded. If the inputted password is authentic as the second password, it is judged whether or not the decoded password 2 coincides with the inputted password (STEP S64). If it coincides with the inputted password, the user is authorized to read out the root directory (STEP S65). If not, the user inhibits access to the storage medium (STEP S66).

Further, at the step S63, if the password inputted by the user coincides with the password 1, the password 2 can be obtained by decoding the data written to the above-described reserved area according to the password 1. The root directory is decoded by the second password. Then, the remaining data area is decoded by the password 1 input by the user to be accessed. As the result, in this case, the user is authorized to access the whole storage medium (STEP S62).

Validity check of the passwords 1 and 2 are executed by the interface section of the computer 2 or the disk drive on the above-described explanation, but the present invention is not restricted to those and it is also possible to perform the validity check by a firmware of the optical magnetic disk controller 11 of storage device 1.

A third embodiment of the present invention will be now explained. In this embodiment, a range for access control is recorded on a disk when formatting the storage medium. At first, an exclusive area for writing control information for access control is defined on the storage medium. The exclusive area can be set as an area a file system does not administrates, not shown in FIG. 2, for example. Information illustrated on a table 3 is transmitted from the computer 2 and is written to the optical magnetic disk controller 11.

TABLE 3

| NAME | LENGTH | PURPOSE | RESPECIFICATION |
|---|---|---|---|
| WRPW | 16 B | PASSWORD FOR AUTHORIZING TO WRITE TO A MEDIUM | ANYTIME |
| RDPW | 16 B | pASSWORD FOR AUTORIZING TO READ OUT | |
| RD2POS | 4 B | UPPER LEVEL OF LBN PD2PW PERMITS TO READ | BY FORMAT-UNIT |
| RD2PW | 12 B | AUTHORIZING TO READ FROM LBN0 TO RD2POS OF BAND 0, IN WHICH THERE IS A DIRECTORY AREA IN GENERAL | |

If RDPW is specified, data cannot be read from and written to.
If WRPW is specified, data cannot be written to.
RD2PW is a passsword for showing only a directory area.

In a case of accessing the data, a logical sector number usually specified is not allocated to the exclusive area to which the information indicated in the table 3 is written. Accordingly, normal data access usually executed by specifying a sector number from a computer side, such as an application program or device driver, cannot be executed.

In here, WRPW (write or read password) and RDPW (read password) shown in the table 3 are used for authorizing the user to write to and read from the storage medium, respectively. For example, when the WRPW coincides, both the data writing and reading can be permitted, and when the RDPW is coincident, only data reading can be authorized.

RD2PW and RD2POS are related to the present invention, and the password RD2PW is to control access to an area from the sector number 0 to a sector shown by the RD2POS.

It is also possible to employ not only a method by which one value of RD2POS is specified, but also a method by which two values, for example, RD2POS_1 and RD2POS_2, are written to the exclusively reserved area for access control, so that sectors from RD2POS_1 to RD2POS_2 can be read out if the RD2PW is coincident.

It is of course possible to specify a sector range by more plural values. A command shown in a table 4 is acceptable by a firmware of the optical magnetic disk controller 11 in the storage device 1 to access from the computer 2 to this area or to compare the password written to the area with a password the user specifies.

TABLE 4

| COMMAND NAME | PARAMETER | MEANING AND PURPOSE |
|---|---|---|
| WRITE_PW | TYPE PASSWORD | WRPW, RDPW and RD2PW are changed by specifying the type |
| SET_USPW | (TYPE) PASSWORD | A password a user inputs is conveyed to a firmware |

In here, WRITE_PW of the table 4 is a command for specifying a password to the exclusive area for access control. The firmware of the optical magnetic disk controller 11 receives this command under the condition where the user is authorized to write to the storage medium and a password is set on a corresponding location of the exclusive area for access control shown in the table 3.

SET_USPW is a command for conveying the password the user inputs for using the storage medium in which a password is set for access control to the firmware of the optical magnetic disk controller 11 in the storage device 1.

The firmware compares the password specified by a parameter of SET_USPW, i.e., a SCSI command, with WRPW, RDPW or RD2PW written in the exclusive area for access control of the storage medium according to a type specified by the parameter. If the passwords coincide, access control is executed according to meanings of the passwords.

Further, a type of the password may not be shown in a parameter as an example of SET_USPW. In this case, the firmware compares password character rows specified by SET_USPW with WRPW, RDPW and RD2PW written in the exclusive area for access control of the storage medium in this order, and a first coincident password is considered as specified.

A case where the password type is not specified by the SET_USPW command will be later explained. However, nothing is written to the storage medium by the SET_USPW command.

Further, when a condition for authorizing access to the storage medium is changed by specifying the SET_USPW command, this condition is kept until the medium is removed, a power of the storage device 1 is turned off or reset, or a WRITE_PW or new SWT_USPW command is issued.

The above-described processes will be now explained in more detail.

In here, a condition for authorizing access to the storage medium is shown in the following table 5.

TABLE 5

| CONDITION NAME | CONTENTS |
|---|---|
| NAC | DISABLING ALL ACCESSES EXCEPT INPUTTING A PASSWORD (SET_USPW). |
| BOR | ENABLING TO READ FROM LBN0 TO RD2POS. INHIBITING WRITE TO WHOLE MEDIUM. |
| RDE | ENABLING ONLY TO READ WHOLE MEDIUM. WP NOTCH IS REGAREDED AS ON. |
| RWE | ENABLING TO READ AND WRITE WHOLE MEDIUM. NORMAL ACCESS. IF WP NOTCH IS ON, DISABLING TO WRITE. |

Differences of operations of representative commands according to each condition for authorizing access are shown in the table 5 by taking a SCSI command as an example.

TABLE 6

| Status | Test Unit Ready | Read | Erase/Write | Format_Unit |
|---|---|---|---|---|
| RWE | ok | ok | ok | ok |
| RDE | ok | ok | Regarded as wr-protected to distinguish by a detail code | Enabling by using an exclusive command interface |
| BOR | ok | **1 | | |
| NAC | not ready **2 | | | |

Further, **1 of the table 6 means readable only within a LBA range specified on the medium. Therefore, when accessing the area other than the specified LBA range, a read error is returned.

In **2, it is distinguished from a situation where the medium is not actually inserted is distinguished by a detail code.

In **3, only when a flag provided on the firmware is ON, Format_Unit command is received by an exclusive command interface. The flag is set by a send_diag command. This flag is cleared (being OFF) each when supplying a power, initializing a firmware of a device, and inserting and removing a storage medium.

Operations when inserting the medium and supplying a power of the storage device 1 will be now explained.

When a power is supplied, the storage device 1 initializes a condition by a firmware of the optical magnetic disk controller 11. After that, it is judged whether or not the storage medium is inserted. If inserted, the medium is exchanged as if the storage medium is removed or inserted at that time.

The firmware provided on optical magnetic disk controller 11 of the storage device 1 judges what condition the password of the storage medium is when inserting the storage medium, i.e., judges what password is set on the storage device. When the password area is all zero, it is regarded as the password is not set.

A condition for authorizing access to the storage device 1 is set based on the result of this judgment according to the following table 7.

TABLE 7

| | WRPW | RDPW | RD2PW | Status Name | Writing | Reading | Reading a directory |
|---|---|---|---|---|---|---|---|
| 1 | 0 | 0 | 0 | RWE | enable | enable | enable |
| 2 | 0 | 0 | 1 | | | | enable |
| 3 | 0 | 1 | 0 | NAC | disable | disable | disable (*) |
| 4 | 0 | 1 | 1 | | | | disable |
| 5 | 1 | 0 | 0 | RDE | disable | enable | enable |
| 6 | 1 | 0 | 1 | | | | enable |
| 7 | 1 | 1 | 0 | NAC | disable | disable | disable (*) |
| 8 | 1 | 1 | 1 | | | | disable |

1 A password is set.
0 A password is not set.

Further, a password informed from the computer 2 to the storage device 1 is ignored and all data accesses can not be possible until the condition settings are finished.

In the table 7, RD2PW has its meaning in a condition where the RDPW is set. If the RDPW is not set, there is no influence depending on existence of RD2PW. Additionally, in the table 7, this setting is considered as that a means for authorizing to read only to a directory section is not prepared when RD2PW is not set, and therefore, when RD2PW is not set, it follows only the setting of the RDPW.

On the contrary, it is possible to set as reading from the directory section is always allowed if the RD2PW is not set. In the later case, if the RDPW is set, and the RD2PW is not set, the condition is set as BOR that means enabling to read only the directory section, not NAC (disabling to access) (two positions with * marks shown in the table 7 become enable).

According to the initial settings, even if the password is not informed from the computer 2, the storage device 1 has a function for normally operating the storage device, similarly to the conventional storage device.

A process for changing a condition for authorizing access according to the informed password by the storage device 1 will be further explained.

The computer 2 employing the storage device 1 informs a password to the storage device 1 by using a SCSI command before employing the inserted storage medium. In this embodiment, the command for informing the password is now considered as a SETUSPW command.

If the computer 2 informs the password to the storage device 1 in the condition where the storage medium is inserted, the storage device 1 executes processing for confirming a password by using a password character row specified by the parameter of the SETUSPW command according to the operational flow charts shown in FIGS. 11 to 13 described later.

If the password coincides with either one of the passwords recorded on the medium, the condition for authorizing to access is changed according to the result. When the SETUPSW command is sent on a condition where the medium is not inserted, the optical magnetic disk controller 11 of the storage device 1 stores the sent password in a working area of the firmware.

After that, the process for confirming a password by using the saved password is executed when the storage medium is inserted. When the SETUP command is issued repeatedly, the firmware clears the a previously registered password, if it exists, and executes the above-described process.

Then, when a certain access has been authorized according to the previously registered password, the authorization of the access is cancelled before executing the process for confirming a password. When the storage is not inserted, and the SETUP command is repeatedly issued, the saved password is replaced and it is canceled to authorize access as to be NAC for inhibiting to read and write in all.

Additionally, the user can inhibit to access temporally by specifying a wrong password intentionally.

Figure 11:
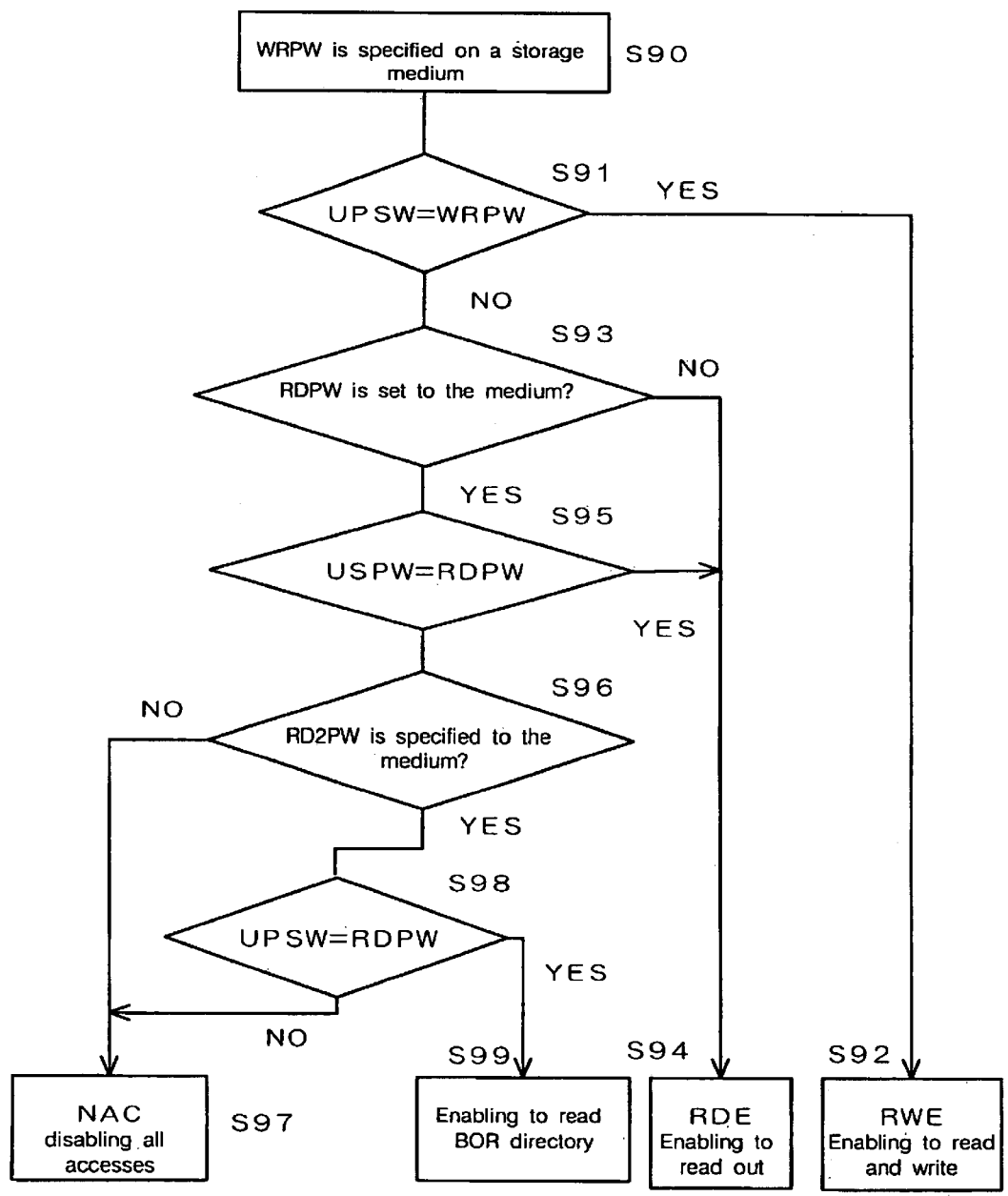
FIG. 11 is a first operational flow chart when at medium is inserted and a power is supplied corresponding to a table 7 in the third embodiment.
Figure 12:
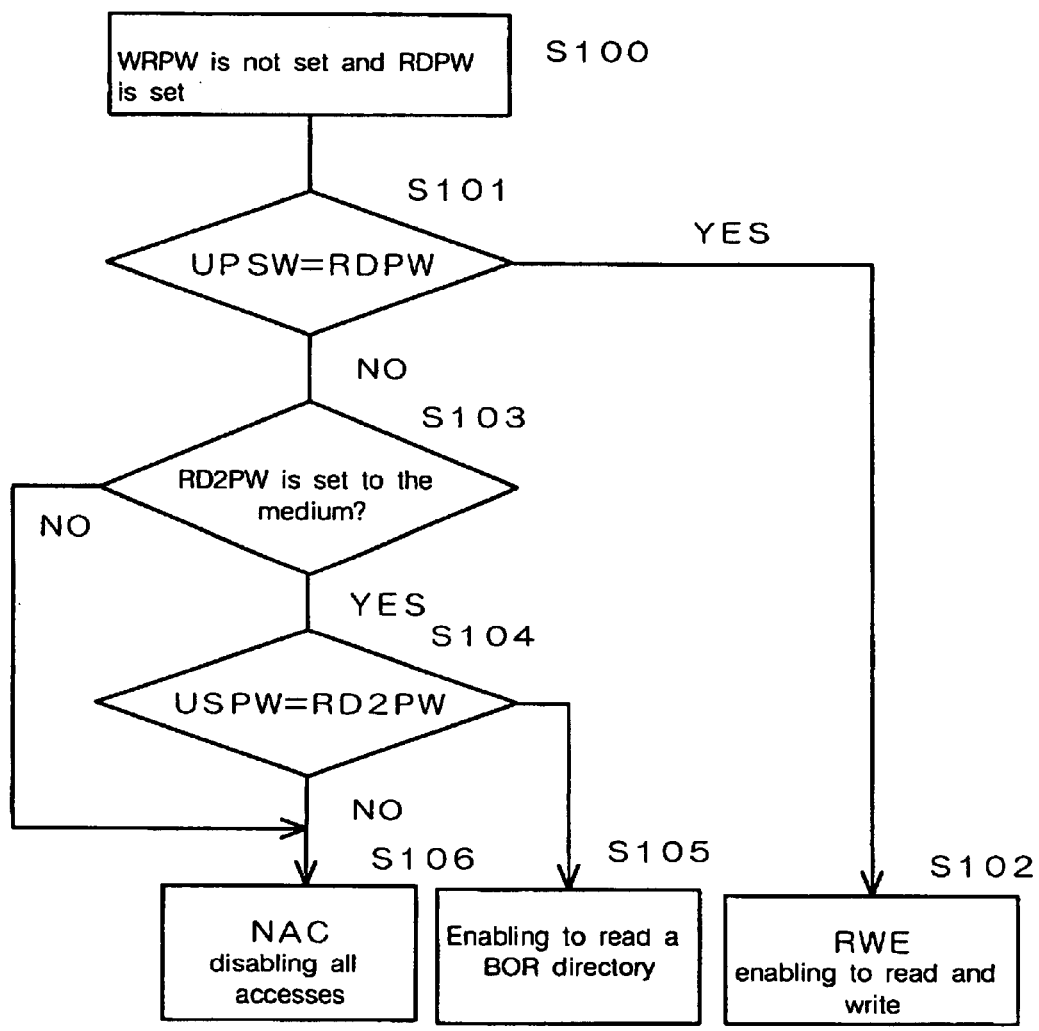
FIG. 12 is a second operational flow chart when a medium is inserted and a power is supplied corresponding to a table 7 in the third embodiment.
Figure 13:
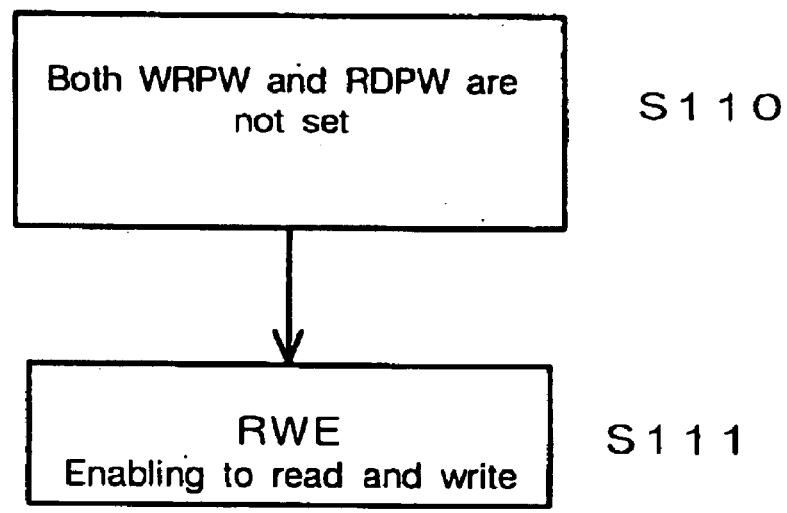
FIG. 13 is a third operational flow chart when a medium is inserted and a power is supplied corresponding to a table 7 in the third embodiment.

Processes for changing the condition for authorizing access by the storage device 1 according to a password informed from the computer 2 will be further explained according to operational flow charts shown in FIGS. 11 to 13 corresponding to the above-described table 7.

In FIG. 11, when a password WRPW for authorizing access for reading from or writing to the storage medium is specified (STEP S90), it is judged whether or not USPW and WRPW are coincident (STEP S91).

When the USPW and WRPW are coincident, the condition is set as RWE that means to enable both reading and writing accesses (STEP S92).

If not, it is further judged whether or not the RDPW is set on the storage medium (STEP S93). When RDPW is not set, the condition is set as RDE that means to enable only reading access corresponding to conditions 5 and 6 of the table 7 (STEP 994).

If the RDPW is set, it is further judged whether or not the USPW and RDPW coincide with each other (STEP S95). If they coincide, the condition is set as RDE that means to enable only reading access (STEP S94).

If not, it is judged whether or not the RD2PW is specified to the medium (STEP S96). If not, the condition is set as NAC that means to disable all accesses (STEP S97).

On the contrary, when the RD2PW is specified to the medium, it is judged whether or not the USPW and RD2PW coincide with each other. If they coincide, it becomes possible to read the BOR directory (STEP S99). If not, the condition is set as NAC that means to dissemble all accesses (STEP S97).

A process in the case where WRPW is not set and RDPW is set (corresponding to 3 and 4 of the table 7) will be now explained in FIG. 12.

If the WRPW is not set and RDPW is set (STEP S100), it is judged whether or not the USPW coincides with the RDPW (STEP S101). On this judgment, when the USPW coincides with the RDPW, the condition is set as RWE that means to enable reading and writing (STEP S102).

If not, it is judged whether or not the RD2PW is set on the medium (STEP S103). If the RD2PW is set to the medium, it is judged whether or not the USPW coincides with the RD2PW, corresponding to a condition 4 of FIG. 7 (STEP S104).

If the USPW coincides with the RD2PW, it becomes possible to read the BOR directory (STEP S105). On the contrary, if not, control is returned to step S103. Then, if the RD2PW is not set to the medium, the condition is set as NAC (STEP S106).

Then, if both WRPW and RDPW are not set (STEP S110) corresponding to conditions 1 and 2 of FIG. 7, the condition is set as RWE that means to enable reading and writing (STEP S111).

As the embodiments of the present invention are explained in accompanying with the attached drawings, it is a feature of the present invention that a user is authorized to read data from a part of a directory area on a storage medium even if a user can specify a password given to the storage medium.

Accordingly, the user can know an outline of information recorded in a storage medium without authorizing access to a whole disk. Thereby, it is possible to prevent the user from accessing to secret information carelessly. Further, it is realized to restrictedly administrate a password for authorizing access to the whole disk, and further, to easily administrate the password for accessing the outline without complex operations.

What is claimed is:

1. A data protection method for protecting data recorded in a removable storage medium, placed in a data device, wherein a password or data for verifying the password is set in the removable storage medium or the data storage device, to which information processing equipment accesses, the method, comprising the steps of:

verifying the password input from the information processing equipment by the data storage device;

authorizing the information processing equipment to access to read out data from and write data in whole areas of the removable storage medium, if the input password is detected as authentic on the verification; and authorizing the information procecessing equipment to access to read out data from only a predetermined area, of logical block addresses in the removable storage medium, if the input password is not authentic on the verification.

2. The protection method according to claim wherein the predetermined specified area of logical block addresses of the removable storage medium includes a label given to the removable storage medium in an administrative area, or a directory area.

3. The protection method according to claim 1, wherein password verification step includes first, second and third verification respectively for verifying whether or not the input password is a first password, a second password or a third password; and wherein data can be written to and read out from the whole removable storage medium when the input password specified by a command transmitted from the information processing equipment on the first verification coincides with the first password;

data can be read out from the whole removable storage medium when the input password specified by the command coincides with the second password on the second verification; and data can be read out from from the predetermined specified area of logical block addresses of the removable storage medium when the input password specified by the command coincides with the third on the third verification.

4. The data protection method according to claim 1, wherein the predetermined specified area of logical block addresses of the removable storage medium includes a label to the removable storage medium, or a directory area, either of which is an administrative area of the removable storage medium.

5. The data protection method according to claim 1, wherein the predetermined specified area of logical block addresses of the removable storage medium is a range obtained by specifying a directory area determined according to a capacity and a logical format type of the removable storage medium.

6. The data protection method according to claim 1, wherein the predetermined specified area of logical block addresses of the removable storage medium is to store plaint text data other areas of the removable storage medium are to store encrypted data, and the data recorded in the plain text only in the predetermined specified area of logical block addresses of the removable storage medium can be read out when the input password is not authentic on the verification.

7. The data protection method according to claim 1, wherein the predetermined specified area of logiccal block addresses of the removable storage medium includes an administrative area of the removable storage medium.

8. A data protection method for a removable storage medium by encrypting an decoding data with the use of a password, comprising the steps of:

verifying whether a password specified before accessing to a removable storage medium is authentic as a first password;

encrypting a second password with the first password and recording the encrypted second password in a specified area of the removable storage medium;

encrypting and decoding data to be stored in a partial area of the removable storage medium with the second password, and encrypting and decoding data to be stored in all other areas of the removable storage medium with the first password;

decoding the encrypted second password so as to enable to access the whole removable storage medium with the second password, when the password specified before accessing the removable storage medium is authentic as the first password; and using the password specified before accessing the storage medium as the second password when the specified password is not authentic as the first password so as to enable to read out data from only the partial area of the removable storage medium.

9. A storage device employing a removable storage medium, wherein a password or data for verifying the password is set in the removable storage medium or the data storage device, which can be connected to information processing equipment, comprising:

a verifying unit for verifying the password input from the information processing equipment by the data storage device; and an access control means for authorizing the information processing equipment to access to read out data from and write data in whole areas of the removable storage medium, if the input password is authentic on the verification; and authorizing the information processing equipment to access to read out data from only a predetermined specified area of logical block addresses in the removable storage medium, if the password is not authentic according on the verification.

10. The storage device according to claim 9, wherein the verifying unit verifies whether or not the password input from the information processing equipment to access the removable storage medium is authentic as a first or second password; and the control unit permits the information processing equipment to access to the whole removable storage medium when the input password is authentic as the first password on the verification by the verifying means, and permits the information processing equipment to access the predetermined specified area of logical block addresses of the removable storage medium when the input password is authentic as not the first password but the second password on the verification by the verifying unit.

11. The storage device according to claim 9, wherein the predetermined specified area of logical block addresses of the removable storage medium includes a label given to the removable storage medium in an administrative area or a directory.

12. The storage device according to claim 9, wherein the predetermined specified area of logical block addresses of the removable storage medium is a range obtained by specifying a directory area determined based on a capacity and a logical format type of the removable storage medium with start and end logical block addresses.

13. The storage device according to claim 9, wherein the predetermined specified area of logical block addresses of the removable storage medium includes an administrative area of the removable storage.

14. A storage device employing a removable storage medium, wherein a password or data for verifying the password is set in the removable storage medium or the data storage device, which can be connected to information processing equipment, comprising:

a circuit controller for controlling to write and read data to and from a removable storage medium by a firmware; and a mechanical controller controlled by the circuit controller for writing and reading data to and from the removable storage medium, wherein the circuit controller sets first, second and third passwords in advance in an exclusive area, which a file system does not administrate, of the removable storage medium, wherein when a password specified by a command transmitted from the information processing equipment coincides with the first password, the circuit controller authorized the information processing equipment to write and read out to and from the whole removable storage medium, when the password specified by the command coincides with the second password, the circuit controller authorizes the information processing equipment only to read from the whole removable storage medium, and farther, when the password specified by the command coincides with the third password, the circuit controller authorizes the information processing equipment to read out data only from the predetermined specified area of logical block addresses of the removable storage medium.

15. The storage device according to claim 14,
wherein the predetermined specified area of logical block addresses of the removable storage medium in an administrative area or a directory area is specified according to start and end logical block addresses.

16. A storage system including information processing equipment with an interface section, in which a device driver is installed, and a storage device is connected to the information processing equipment, wherein the device driver controls to record data in a plain text an area of logical block addresses in a removable storage medium, and to encrypt and record data in other areas of the removable storage medium, and to verify a password, and enables to decode the encrypted data when the password is authentic on the verification and to read out the data recorded in a plain text only in the area of logical block addresses in the removable storage medium when the password is not authentic on the verification.

17. The storage system according to claim 16, wherein the password includes first and second passwords, and the device driver controls to verify whether or not a password specified before accessing a removable storage medium provided at the storage device is authentic as a first password, to encrypt the second password with the first password, to record the encrypted second password in a part of the removable storage medium, to encrypt and decode the part of the removable storage medium by the second password, and to encrypt and decode other parts of the removable storage medium by the first password, and enables to access the whole removable storage medium by decoding the encrypted second password by the specified password when verified authentic as the first password, and to access only the part of the removable storage medium to read out data by using the specified password as the second password when verified not authentic as the first password.

18. The storage system according to claim 17, wherein the partial area of the removable storage medium includes a label given to the removable storage medium, or a directory, either of which is an administrative area of the removable storage medium.

19. The storage system according to claim 17, wherein the partial area of the removable storage medium is a range for specifying a directory area determined based on a capacity and a logical format type of the removable storage medium.

20. The storage system according to claim 16, wherein the partial area of the removable storage medium includes a label given to the removable storage medium, or a directory area, either of which an administrative area of the removable storage medium.

21. The storage system according to claim 16, wherein the partial area of the removable storage medium is a range for specifying a directory area determined based on a capacity and a logical format type of the removable storage medium with start and end logical block addresses.

22. A storage device employing a removable storage medium, which can be connected to information processing equipment, comprising:

an access control unit for authorizing the information processing equipment to record data in a plain text in a partial area of logical block addresses in the removable storage medium, and to encrypt and record data in other areas of the removable storage medium, and to verify a password, and enable to decode the encrypted data when the password is authentic on the verification, and to read out the data recorded in the plain text only in the partial area of the removable storage medium when the password is not authentic on the verification.

* * * * *

UNITED STATES PATENT AND TRADEMARK OFFICE
CERTIFICATE OF CORRECTION

PATENT NO.       : 7,124,301 B1
APPLICATION NO.  : 09/139485
DATED            : October 17, 2006
INVENTOR(S)      : Uchida It is certified that error appears in the above-identified patent and that said Letters Patent is hereby corrected as shown below:

Col. 17, line 9, delete "data device" and insert --data storage device--.

Col. 17, line 49, delete "third on" and insert --third password on--.

Col. 17, line 54, delete "label to" and insert --label given to--.

Col. 17, line 65, delete "plaint" and insert --plain--.

Col. 17, line 66, delete "data other" and insert --data, other--.

Col. 18, line 5, delete "logiccal" and insert --logical--.

Col. 18, line 67, delete "directory" and insert --directory area--.

Col. 19, line 36, delete "farther" and insert --further--.

Col. 20, line 51, delete "enable" and insert --enables--.

Signed and Sealed this

Twenty-fourth Day of April, 2007

JON W. DUDAS
*Director of the United States Patent and Trademark Office*